United States Patent [19]
Tatyrek et al.

[11] 3,888,785
[45] June 10, 1975

[54] INORGANIC SALTS AS INHIBITORS FOR TETRAKISDIMETHYLAMINO ETHYLENE-WATER CHEMICAL INTERACTION

[75] Inventors: Alfred F. Tatyrek, Maplewood; Burton Werbel, West Orange, both of N.J.

[73] Assignee: The United States of America as represented by the Secretary of the Army, Washington, D.C.

[22] Filed: Dec. 22, 1972

[21] Appl. No.: 317,588

Related U.S. Application Data

[63] Continuation of Ser. No. 69,141, Sept. 2, 1970, abandoned.

[52] U.S. Cl. ........ 252/188.3 CL; 240/2.25; 252/186
[51] Int. Cl. ............................................. C09k 1/02
[58] Field of Search ................... 252/186, 188.3 CL; 240/2.25

[56] References Cited
UNITED STATES PATENTS

| | | | |
|---|---|---|---|
| 3,264,221 | 8/1966 | Winberg | 252/188.3 CL |
| 3,311,564 | 3/1967 | Cline | 252/188.3 CL |
| 3,494,871 | 2/1970 | Clapp et al. | 252/188.3 CL |

*Primary Examiner*—Benjamin R. Padgett
*Assistant Examiner*—Irwin Gluck
*Attorney, Agent, or Firm*—Nathan Edelberg; Robert P. Gibson; A. Victor Erkkila

[57] ABSTRACT

Processes and improvements of known processes whereby the oxidation products of tetrakisdimethylamino ethylene are removed by extraction using a dispersion of hydrated alkali metal inorganic salts or an aqueous solution of alkali metal inorganic salts in the presence of proton donors. Use of the dispersion or aqueous solution inhibits any chemical reaction between the proton donor and the tetrakisdimethylamino ethylene.

9 Claims, No Drawings

3,888,785

INORGANIC SALTS AS INHIBITORS FOR TETRAKISDIMETHYLAMINO ETHYLENE-WATER CHEMICAL INTERACTION

The invention described herein may be manufactured, used and licensed by or for the Government for governmental purposes without the payment to us of any royalty thereon.

This is a continuation of application Ser. No. 69,141, filed Sept. 2, 1970, and now abandoned.

BACKGROUND OF THE INVENTION

This invention relates to improved processes and new processes for the removal of oxidation reaction products from tetrakisdimethylamino ethylene.

The chemiluminescent compound, tetrakisdimethylamino ethylene, hereafter referred to as TMAE, is a clear and highly stable liquid which boils at 200°C and freezes at 0°C. Upon exposure to air or oxygen in the presence of a proton donor at room temperature it undergoes autooxidation which is accompanied by a strong chemiluminescence in the blue-green region ($2 \times 10^{-4}$ quantum yield.) The oxidation products tetramethylurea and tetramethyloxamide, act as quenching agents, however, to reduce the chemiluminescent properties of the TMAE.

This quenching action occurs principally by a transfer of energy from the electronically excited TMAE molecules to the tetramethylurea and tetramethyloxamide molecules which is then lost as heat rather than light.

Secondly light energy is lost by absorption wherein the light given off by the oxidation is partially absorbed by the brown tetramethylurea complex. Less of chemiluminescent energy has been reported to reduce the light yield to 50% when 2% of tetramethylurea has formed in the TMAE.

It has been further found that the introduction of a liquid, immiscible with TMAE but a solvent for the oxidation products, allows, through extraction, the removal of tetramethylurea and tetramethyloxamide from intimate contact with the TMAE.

By continuous extraction of the oxidation products, chemiluminescence has been increased from $0.5 \times 10^3$ lumen sec./ft.$^2$/parts by volume to $21.3 \times 10^3$ lumen sec./ft.$^2$/parts by volume. Presently, water, organic materials of relatively low viscosities which have a plurality of hydroxyl groups per molecule, and amines having a plurality of hydroxy substituents have been used to remove the tetramethylurea and tetramethyloxamide from contact with the TMAE. For convenience, efficiency and economic reasons, water is preferred.

However, it has been found that during a water extraction process, a brown, light absorbing TMAE monocation complex forms in the water phase and a slow chemical reaction between the water and TMAE develops especially at elevated temperatures. Thus the use of water as an extractor has a practical application only to batch type purifications and is not suitable for continuous extraction since both of the above features would have a degrading effect upon any light output produced during autooxidation.

We have found that by adding certain salts to the extraction solution in nearly saturating amounts or by using dispersions of certain hydrated salts, both of the degrading effects heretofore prevalent in extraction processes are inhibited.

Accordingly, it is an object of this invention to provide a method for the removal of tetramethylurea and tetramethyloxamide from TMAE by use of a dispersion of hydrated salts.

A further object is to provide an improved method for the continuous extraction of TMAE by use of an aqueous salt solution.

A still further object is to provide an aqueous salt solution which will inhibit the formation of a brownish TMAE monocation complex in the water phase of an extraction system.

Yet another object is to provide an aqueous salt solution which will inhibit any chemical reaction between the TMAE and the aqueous solution used for extraction.

Other objects and many of the attendant advantages of this invention will be readily appreciated as the same becomes better understood by reference to the following detailed description.

In accordance with these objects we have found that the use of an alkali metal inorganic salt solution in a continuous extraction of TMAE or a dispersion of hydrated alkali metal inorganic salts mixed with the TMAE will remove tetramethylurea and tetramethyloxamide and yet inhibit any TMAE - proton donor (water) reactions.

The following alkali metal inorganic salts and their hydrates have been found very effective in stabilizing TMAE - proton donor (water) reactions: Sodium nitrite $NaNO_2$; sodium carbonate $Na_2CO_3$; sodium thiosulfate $Na_2S_2O_3$; sodium chloride NaCl; trisodium phosphate $Na_3PO_4$; sodium borate $NaB_4O_7$; potassium carbonate $K_2CO_3$; potassium nitrite $KNO_2$; potassium bromide KBr; potassium sulfate $K_2SO_4$; potassium thiosulfate $K_2S_2O_3$ and potassium phosphate $K_3PO_4$.

Other inorganic salts and their hydrates, having substantially the same dual inhibiting effect, when placed in a TMAE extraction solution or dispersion, may be used advantageously in the practice of our invention.

By inhibiting any water-TMAE reactions, our inventive system will allow continuous extraction of the TMAE, and will increase TMAE's chemiluminescent properties heretofore degraded by tetramethylurea and tetramethyloxamide. Further storage life will be greatly enhanced at a small increase in cost.

Although it is not intended that the invention be limited thereto, there is set forth herein below for purposes of illustration, examples of how TMAE-inhibitor systems may be produced:

EXAMPLE I

A saturated solution of sodium nitrite was prepared by dissolving 10 grams of $NaNO_2$ in 15 cc of $H_2O$. 25 grams of this solution were added to 75 grams of TMAE. 4 grams of colloidal silica were added as a gelling agent while the mixture was stirred rapidly in an electric blender at room temperature. The blending operations were carried out in a nitrogen atmosphere, free of oxygen. The gelled mixture was then placed in storage at 80°C.

EXAMPLE II

Approximately 5 grams of sodium thiosulfate, pentahydrate $Na_2S_2O_3 \cdot 5H_2O$ was finely pulverized and uniformly blended into a 20 gram formulation of about 50% TMAE and 50% paraffin at room temperature in a nitrogen atmosphere using a sigma blade mixer. The resulting mixture was then cooled, allowed to solidify and then placed in storage at about 80°C.

EXAMPLE III

Approximately 5 grams of sodium carbonate decahydrate $Na_2CO_3.10H_2O$ was blended in a nitrogen atmosphere with about 20 grams of a 50% mixture of TMAE and powdered polyethylene using a sigma blade mixer at room temperature. The resultant formulation was then stored at about 74°C.

EXAMPLE IV

About 10 grams of hydrated trisodium phosphate, $Na_3PO_4.12H_2O$ was dissolved in 35 grams of distilled water. In a nitrogen atmosphere, approximately 55 grams of pure TMAE were added to this solution and the resulting mixture placed in a sealed bottle. The mixture was shaken and the upper TMAE layer allowed to separate from the lower aqueous layer. The solutions were then placed in storage at about 74°C.

EXAMPLE V

A saturated solution of potassium carbonate was prepared by dissolving about 5 grams of anhydrous potassium carbonate $K_2CO_3$ in about 5 mls of distilled water. This solution was uniformly blended in a nitrogen atmosphere with a melted composition of approximately 20 grams of TMAE and about 20 grams of paraffin and allowed to cool and solidify. The composition was then stored at about 74°C.

TMAE/salt solutions/dispersions used in determining the effectiveness of the salt's inhibiting effects are described below:

while optimum chemiluminescence occurs when 50% mixtures of TMAE and salt inhibitor are used.

Thus, thru the practice of our invention, an inhibiting effect can be achieved which will allow the practical storage of TMAE with proton donors over long periods of time at elevated temperatures without any appreciable loss of chemiluminescent properties.

We wish it to be understood that we do not desire to be limited to the exact processes shown and described for obvious modification will occur to a person skilled in the art.

We claim:

1. A process for increasing the storage stability of a chemiluminescent composition containing TMAE and water in the absence of oxidizing and dehydrating agents, which comprises incorporating therein a water-soluble, inorganic alkali metal salt.

2. The process of claim 1 wherein the alkali metal salt is selected from the group consisting of nitrites, carbonates, phosphates, borates, sulfates, thiosulfates, chlorides and bromides.

3. The process of claim 1 wherein the alkali metal is selected from the group consisting of sodium, lithium and potassium.

4. The process of claim 1 wherein the water is in the form of a crystalline hydrate of the alkali metal salt.

5. A chemiluminescent composition devoid of oxidizing and dehydrating agents, which comprises TMAE, water and a sufficient amount of a water-soluble, inorganic alkali metal salt to increase the storage stability of the TMAE.

6. The composition of claim 5 wherein the alkali

TABLE I

TMAE/inhibitor chemilumenescence at high temperatures and long storage times.

| 50% TMAE<br>50% SALT SOLUTION | STORAGE<br>TEMPERATURE | STORAGE<br>TIME | EXPOSURE TO AIR<br>AFTER STORAGE PERIOD |
|---|---|---|---|
| TMAE/NaNO$_2$ | 80°C | 4 months | Strong green chemiluminescence |
| TMAE/Na$_2$S$_2$O$_3$.5H$_2$O | 80°C | 12 months | Strong green chemiluminescence |
| TMAE/Na$_2$CO$_3$.10H$_2$O | 74°C | 18 months | Strong green chemiluminescence |
| TMAE/Na$_3$PO$_4$.12H$_2$O | 74°C | 18 months | Strong green chemiluminescence |
| TMAE/K$_2$CO$_3$ | 74°C | 18 months | Strong green chemiluminescence |
| TMAE/H$_2$O | 74°C | 4 months | No chemiluminescence. TMAE consumed |

From the above table it can be seen that the TMAE/$H_2O$ in the presence of proton donors underwent a chemical deterioration, such that all the TMAE was consumed within 4 months. The 50% mixtures of TMAE and various dispersions and solutions of alkalai metal inorganic salts however exhibited strong chemiluminescence for storage periods ranging from 4 to 18 months and temperatures ranging from ambient temperatures to 80°C.

Although the examples shown are represented by 50% mixtures of TMAE and salt inhibitor, mixtures of 40–60% TMAE and 60–40% salt inhibitor have been found effective in prolonging chemiluminescent properties. Mixtures of 45–55% TMAE and 55–45% salt inhibitor have exhibited superior chemiluminescence metal salt is selected from the group consisting of nitrites, carbonates, phosphates, borates, sulfates, thiosulfates, chlorides and bromides.

7. The composition of claim 5 wherein the alkali metal is selected from the group consisting of sodium, lithium and potassium.

8. The composition of claim 5 wherein the water is in the form of a crystalline hydrate of the alkali metal salt.

9. The composition of claim 5 additionally containing an agent adapted to solidify the composition selected from the group consisting of paraffin, colloidal silica and powdered polyethylene.

* * * * *